(12) United States Patent
Ong et al.

(10) Patent No.: US 7,571,489 B2
(45) Date of Patent: Aug. 4, 2009

(54) ONE TIME PASSCODE SYSTEM

(75) Inventors: Peng T. Ong, Singapore (SG); Sriram Ramachandran, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 10/969,435

(22) Filed: Oct. 20, 2004

(65) Prior Publication Data
US 2006/0083228 A1    Apr. 20, 2006

(51) Int. Cl.
*H04L 21/00* (2006.01)
(52) U.S. Cl. .................................... 726/29
(58) Field of Classification Search ............. 726/4, 726/29; 713/169, 182
See application file for complete search history.

(56) References Cited

U.S. PATENT DOCUMENTS

| | | | |
|---|---|---|---|
| 5,734,718 A * | 3/1998 | Prafullchandra | 713/183 |
| 5,751,812 A * | 5/1998 | Anderson | 713/155 |
| 6,067,621 A | 5/2000 | Yu et al. | |
| 6,480,958 B1 | 11/2002 | Harrington | |
| 7,158,777 B2 * | 1/2007 | Lee et al. | 455/411 |
| 2004/0255119 A1* | 12/2004 | Ukeda et al. | 713/169 |

FOREIGN PATENT DOCUMENTS

WO    WO 03/001736 A1    1/2003

* cited by examiner

*Primary Examiner*—Andrew L Nalven
(74) *Attorney, Agent, or Firm*—Francis Lammes; Stephen J. Walder, Jr.; Jeffrey S. LaBaw

(57) ABSTRACT

The invention relates to a system for securing access to resources or computer systems by means of a self modifying, single use password that limits access to a system and automatically changes each time it is used. Independent computer systems, or clients, are utilized by users to generate one time passcodes to prove their identity to one or more authentication servers. Servers are used to authenticate user inputted one time passcodes, to maintain and update the status of one time passcode clients, and perform rekeying and reset operations. Middleware, an optional component, allows for the interaction between one time passcode clients and servers. Middleware allows for client rekeying and resets as well as synchronisation between the client and server. The invention facilitates, inter alia, distribution of clients to users, maintaining and administering the status of clients on one or more servers, generation of a one time passcode (OTP), authentication of a one time passcode, rekeying of a one time passcode client, resetting of a one-time passcode client, Resetting of a one time passcode client, requesting for generation of a one time passcode on a communication enabled client through software or hardware interfaces, and authentication of one time passcodes by remote application servers.

14 Claims, 9 Drawing Sheets

| IDd | iseed | skey |
|---|---|---|

*FIG. 1*

| 2.1 | 2.2 | 2.3 | 2.4 | 2.5 | 2.6 | 2.7 |
|---|---|---|---|---|---|---|
| KeyID | iseed | skey | STATUS | LAST SUCCESS | LAST FAILURE | FOREIGN KEY |

*FIG. 2*

| 3.1 | 3.2 | 3.3 | 3.4 |
|---|---|---|---|
| AppID | UserID | OTHER DATA | Key ID |

*FIG. 3*

ONE TIME PASSCODE SYSTEM

FIELD AND BACKGROUND OF THE INVENTION

The invention relates to security means in a computer system, and more particularly, to a system for securing access to resources or computer systems by means of a self modifying, single use password that limits access to a system and automatically changes each time it is used.

Authenticating and controlling access to resources has always been a difficult task. The problem is made more difficult when the resources are separated from the user, and are accessed by users across a possibly insecure computer or telephone network, with the presence of eavesdroppers, intruders and other attackers. The resources could be physical objects such as printers or remote hard disks, or enterprise portals such as an Internet banking site or corporate website.

Traditionally, one of the ways of securing access to resources, both local and remote, has been through passwords. However passwords are typically static. If a username and password is stolen by an eavesdropper, the same username and password combination can be used by the eavesdropper to masquerade as the real user without the user's knowledge, until the user changes his password.

To avoid sending passwords across a network in cleartext, a known way to authenticate users has been to generate a hash code of the authentication information and sending this hash across the network for remote authentication. To further secure this exchange, the hash code could be signed using a publicly available signature algorithm such as RSA or ElGamal. However, these methods still do not protect against replay attacks, where an eavesdropper captures the relevant packets and replays them to a server at a later time.

Password capture is particularly easy when such sensitive data travels across large and possibly hostile networks where the user has no control over many nodes in the network. The so-called "network sniffers" can be easily configured to extract possible username and password combinations from all the traffic travelling across a network.

To thwart the network sniffers, all data exchanges between the user and the resource could be encrypted. There are several encryption schemes available for securing communications between two parties. Hardware encryption devices have been used for decades to secure communications across land based telephone lines. The GSM mobile telephone network uses the A5 encryption algorithm to encrypt data. Network security protocols such as IPSec, SSL and SSH are currently used to secure communications between two computers. These security protocols still assume that the user's computer or communications device is secure and trustworthy whereas this is very often not the case. The user's computer or communications device could be infested with trojans, virii and other malware, which could capture keystrokes or data even before they are encrypted. This problem becomes specially important when dealing with critical services such as banking and enterprise applications.

One of the main problems with the above-mentioned authentication methods is the static nature of the authentication information. A well known means of providing additional security over static authentication information has been the use of one time passwords, which are valid only for one transaction. RSA's SecurID system provides a one time password system consisting of a hardware device which generates one time passwords based on the current time. The one time password generated by this device is supplied to an authentication server for verification. One problem with the SecurID system is that the client device keeps generating a one time password every one to two minutes even when it is not needed. This wastes battery power. Another problem is that the client device and authentication server need to have internal clocks which are synchronised. Secure Computing's "SafeWord" products implement a one time password system based on a secret shared between the client device and the authentication server. However, these products do not protect against an attacker who could have captured the shared secrets.

SUMMARY OF THE INVENTION

It is, therefore, an object of the present invention to provide a one-time passcode system for use in online transactions.

It is another object of the present invention to provide an online security system, which allows maintaining and administering the status of clients on one or more servers.

These and other objects of the present invention are achieved through a provision of system architecture enabling one-time passcode clients, middleware and servers. Clients are utilized by users to generate one time passcodes to prove their identity to one or more authentication servers. Servers are used to authenticate user inputted one time passcodes, to maintain and update the status of one time passcode clients, and perform rekeying and reset operations. Middleware is an optional component which allows for the interaction between one time passcode clients and servers. Middleware allows for client rekeying and resets as well as synchronisation between the client and server.

The present invention facilitates the following processes:
Distribution of clients to users
Maintaining and administering the status of clients on one or more servers
Generation of a one time passcode (OTP)
Authentication of a one time passcode
Rekeying of a one time passcode client
Resetting of a one time passcode client
Requesting for generation of a one time passcode on a communication enabled client through software or hardware interfaces
Authentication of one time passcodes by remote application servers These tasks are achieved by the following means:
Client and server devices or software have non volatile memory, a processor and a software program providing pre-determined interfaces
Sharing one public value (device ID) and two secrets (iseed and skey) between an OTP client and an OTP server
The server maintains a data store containing data pertaining to the status of clients, their secret key values and other administration and management related data
Provision of a communication channel between the OTP client and OTP server
Means for performing a computation to calculate the one time passcode on the client
The server performing a series of computations to authenticate the one time passcode received from a client, and estimating whether the client has stepped ahead of the server, and subsequently returning a success or failure message after updating its internal data store
Software or hardware interface on communication enabled clients which allow external software or hardware to request the client to generate a new one time passcode and return this value to the calling function Software or hardware interface on communication enabled clients which allow external software or hardware to reset the client's internal secret keys, namely skey and optionally iseed Application programming interfaces, graphical interfaces or command line interfaces provided by the server allowing external entities to manage the server, including but not limited to query and change of client status, update of application related data Authentication stubs for one time passcode (OAS) connected to the server allowing remote or local application software to authenticate a user supplied one time passcode.

Web wrapper servers allowing the use of one time passcodes with web enabled application servers.

According to the preferred embodiment, the OTP infrastructure disclosed herein operates with the OTP clients (USB combo device, standalone one time passcode client device), OTP middleware (access agent, PDA synchronisation program, standalone OTP middleware program), and OTP servers (OTP server, IMS server). A second embodiment provides for the application with a standalone OTP client and server model. A third embodiment provides for the OTP clients with software interfaces (communication enabled client devices, software clients on a PDA, software OTP client on a PC), OTP middleware and OTP servers, without the USB combo device.

BRIEF DESCRIPTION OF THE DRAWINGS

Reference will now be made to the drawings, wherein like parts are designated by like numerals, and wherein FIG. 1 schematically illustrates the structure of data stored on individual client ID, iseed and skey).

FIG. 2 schematically illustrates the structure of each record (KEYVAL) OTP server maintains for each client in its database FIG. 3 schematically illustrates data (KEYIDWATCH) stored in the attached server and used to link specific applications, user IDs and keys.

DETAILED DESCRIPTION OF THE PREFERRED EMBODIMENTS

Description of the System

Figure 4:
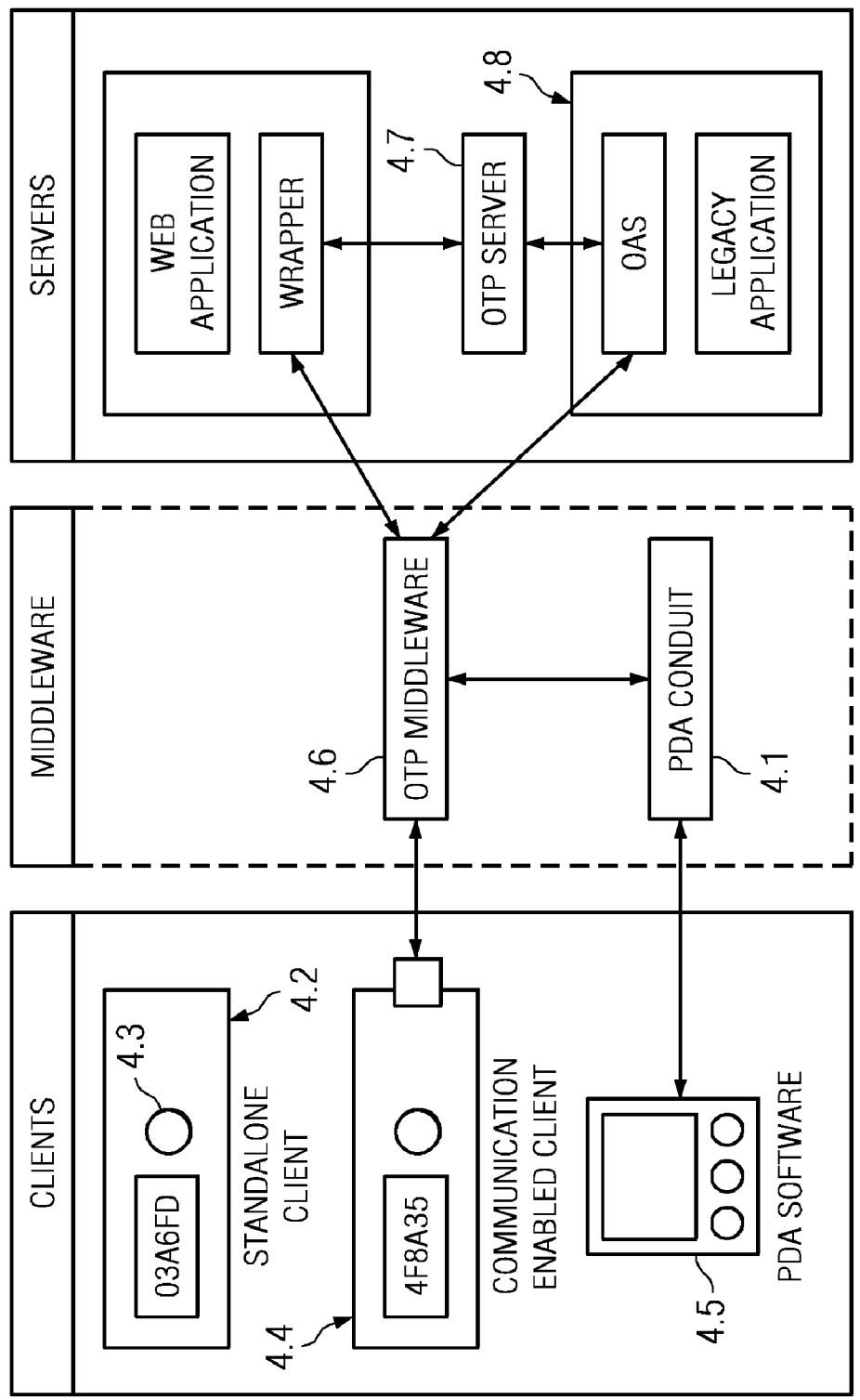
FIG. 4 is a schematic view of the one time passcode system architecture of the present invention, including clients, middleware and servers and illustrates possible communication channels between them.

According to the present invention, the one time passcode system can be divided into three main component groups, namely, clients, middleware and servers. The Clients comprise data processing systems, such as hardware devices or software programs running on a PDA, computer or other device capable of performing computations and storing data in non volatile memory or volatile memory, which is continuously powered on and can be backed up and restored on a power shutdown. This memory is used by the client to store some data related to its internal state. Clients may be able to display the results of their computation on a screen or some other sort of display. Clients may also interface with external hardware or software by means of hardware interfaces allowing for the transfer of data between the client device and an external device or software. If the client is implemented purely in software running on a computer, it may have software interfaces to communicate with programs on the same computer. Clients may also be standalone devices with no means of communication with external hardware or software, but only capable of displaying data on a built in screen at a user's request.

Clients may take different forms. A standalone client is a hardware device with a built in power source, a processor, a display screen, a non volatile or volatile memory powered by the battery, and a means of making the device perform a computation, possibly by a user pressing a button on the device. Standalone clients have no other external interface for security reasons to prevent tampering or probing of the device.

Another type of client device, a communication enabled device, is similar to the standalone client, but also provides a hardware interface such as a USB port or serial port, and APIs to communicate with the client for the purpose of requesting the client to generate a fresh one time passcode and making this new passcode available to the calling function, and also for the purpose of resetting some of the client device's internal data. Such a client device may also be combined with components providing other functionality, such as a smart card, flash drive, or other hardware, as an extension of the functionality of the device. For increased security the above two devices may be protected by hardware mechanisms which detect tampering or probing and respond appropriately. These tamper detection and avoidance mechanisms are outside the scope of this invention. More information can be found in the FIPS 140-2 specification, "Security Requirements for Cryptographic Modules", published by the Information Technology Laboratory, National Institute of Standards and Technology, among other publications.

A client may also be a software program on a user's PDA or other device which has a processor, a non volatile or volatile memory store backed up by some power source, a display screen, a means of making the device perform a computation, possibly by a user pressing buttons on a keypad or some other means, and possibly a hardware or software interface for communication with external hardware or software. The user may download software on to such a device allowing the user to perform the necessary computation and possibly interaction with other software or hardware. Clients may also be software programs running on a user's computer. Such clients make use of the computer's data storage and processing capabilities to store data and process information.

Servers are comprised of applications running on computers together with a data storage mechanism, preferably a database management system, and possibly a means of communicating with external hardware and software programs. Servers are used to associate a user with one or more clients, store data corresponding to each client together with its state information, authenticate a user when a one time passcode is supplied, track and catch up with a user's client if the client supplied one time passcode does not match the one time passcode generated on the server, and manage the client status updates, revocation, new users and new clients. If middleware is present, servers also communicate with the middleware for the purpose of refreshing and updating data related to clients and the status of clients. Servers may also provide a programmatic, graphical or command line interface for server management by humans or programs external to the server. The server may also have access to a data acquisition mechanism such as, but not limited to, a CDROM drive, DVD drive, networked information retrieval mechanisms or file transfer mechanisms.

The system may comprise a plurality of servers with varied means of communication between each other. A server may or may not be able to communicate with all other participating servers. Servers may be divided hierarchically, in groups, or otherwise. A system with a plurality of servers gives rise to the problem of synchronising client data across all the servers. The situation is slightly more complex when some servers cannot be reached by some other servers.

As stated above, middleware is an optional component in the system of the present invention. Middleware is comprised of software or hardware capable of communicating with the server and the client. Middlware is used to perform rekeying and resetting of client devices and synchronisation of data between client and server. These operations could be done either on demand by the user, on demand by the server, or based on time. Middleware is of use when the client provides a hardware or software interface for external communication. If the client is a standalone device with no external interface, then the middleware cannot be used.

Description of the Methods

The algorithm used to generate a one time passcode on the client and the algorithm used to verify a client supplied one time passcode on a server have the following structure:

| dfixed | ddynamic |
|---|---|

The client maintains a data structure consisting of two classes of data:

Static (dfixed)

Dynamic (ddynamic)

The data contained in the static data structure is generated or initialized once and is not changed unless the device needs to be reset. For some devices, this may even be burnt into non erasable ROM. The data contained in the dynamic data structure changes each time the client generates a new one time passcode.

Figure 10:
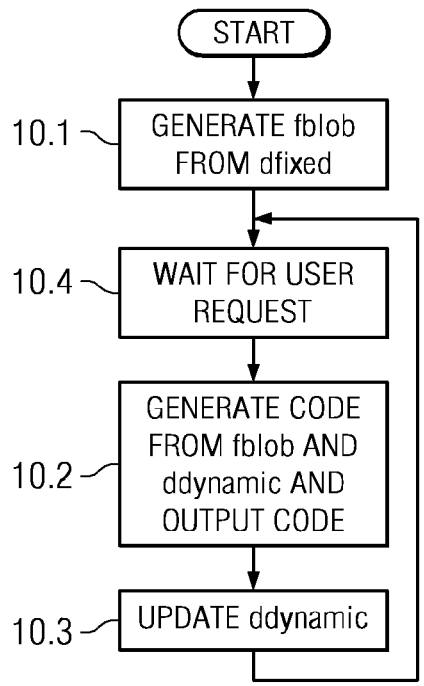
FIG. 10 is a flowchart detailing the general process of generation of a one-time passcode on a client.

The algorithm to generate a one time passcode on the client is described below and is schematically illustrated in FIG. 10. The following steps are followed in the method:

10.1 Client initialization: use all or part of the static data dfixed to generate a fixed blob of data (fblob).

10.2 Use one or more cryptographic operations on fblob and ddynamic to generate the one time passcode CODE.

10.3 Update ddynamic using one or more operations and write it back to the storage area in step 10.2.

10.4 Wait for a user request, receive request from the user to generate a new one time passcode and proceed back to step 10.2.

When performing step 2 above, the cryptographic operation might be a simple encryption using a block cipher. For instance, if $E_k(b)$ denotes the process of encrypting a block of data b using key k, step 2 could consist of an operation such as:

$$CODE=GenCode(E_{ddynamic}(fblob))$$

where GenCode might be a function which takes a block of binary data and outputs a one time passcode which is readable by a human being.

Alternatively, the program might consider maintaining a static key, in which case the operation would amount to:

$$CODE=GenCode(E_{fblob}(ddynamic))$$

It is envisioned that this approach can be preferred for small devices, since a key setup for the encryption operation needs to be done only once because the encryption key fblob is fixed and the data to be encrypted keeps changing after each round. If this is preferred, the process of generating CODE will execute faster than the process described earlier in the first approach.

Figure 11:
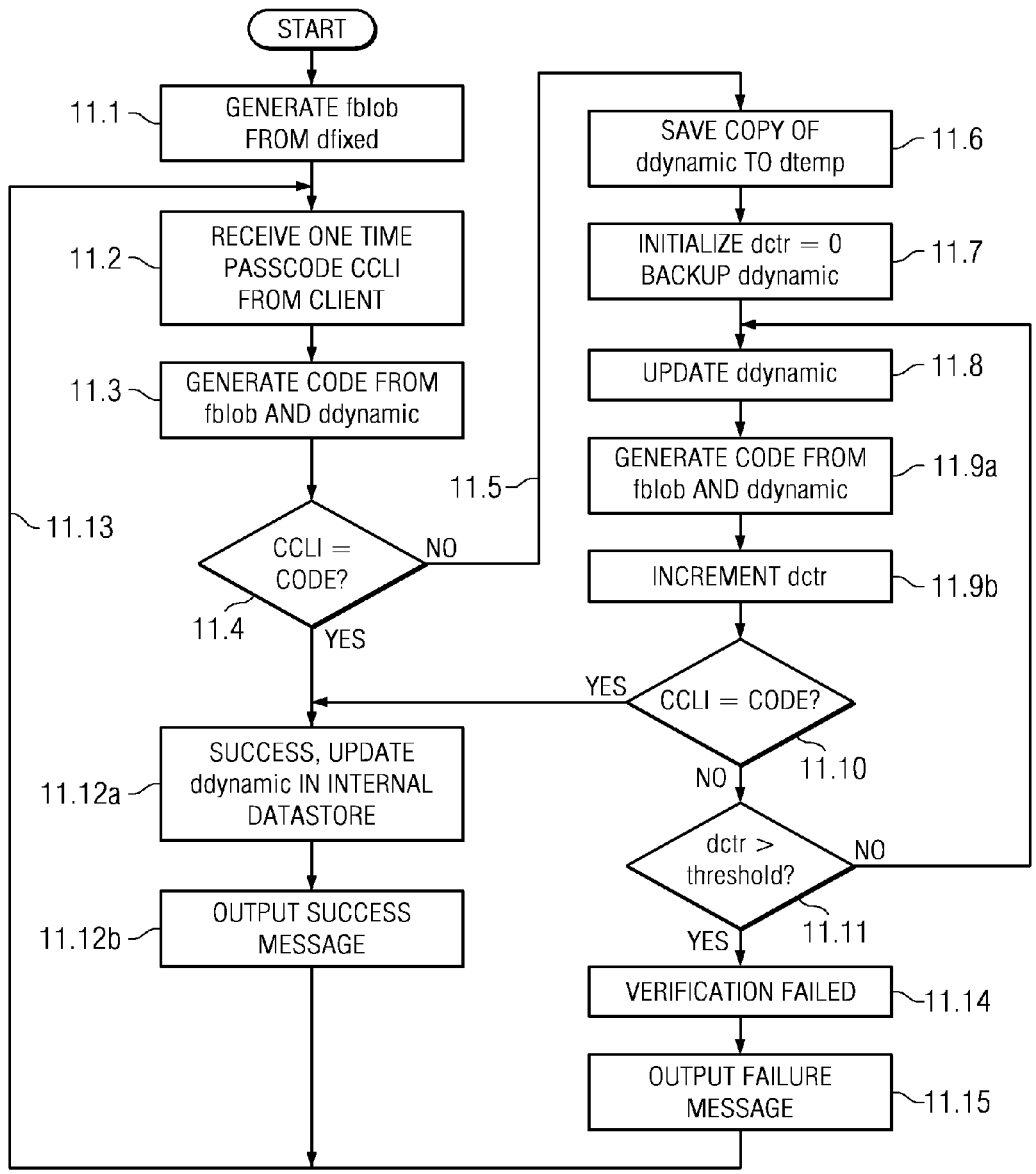
FIG. 11 is a flowchart detailing the general process of verification of a user supplied one time passcode by the server.

The algorithm to verify a user supplied one time passcode on the server is described below and schematically illustrated in FIG. 11. For each client, the corresponding dfixed and ddynamic data structures are transferred to the server before the client can be used.

11.1 For each client deployed, use all or part of the static data dfixed to generate a fixed blob of data (fblob). This process must use the same algorithm and must generate the same value as generated in step dfixed and ddynamic data structures transferred to the server in the client algorithm.

11.2 Receive one time passcode CCLI from the client.

11.3 Use one or more cryptographic operations on fblob and ddynamic to generate the one time passcode CODE. These operations must be the same as those described in step 11.1 in the client algorithm.

11.4 Compare CODE with CCLI. If they match, then the client supplied one time passcode is valid, proceed to step 11.12a.

11.5 If the CODE and CCLI do not match, several other steps must be followed to verify the passcode. Though CODE and CCLI do not match, the client may be ahead of the server in case the user has accidentally requested a one time passcode generation more than once. This algorithm tries to identify such an occurrence and optionally allow the server to either catch up with the client, notify the administrator, or perform some other action.

11.6 Save a copy of ddynamic into a temporary storage area dtemp.

11.7 Initialize a counter dctr to zero to generated backup ddynamic.

11.8 Update ddynamic using one or more operations as described in step 11.3 in the client algorithm.

11.9a Use one or more cryptographic operations on fblob and ddynamic to generate the one time passcode CODE. These operations must be the same as those described in step 11.3 above.

11.9b Increment dctr counter.

11.10 Compare CODE with CCLI. If they match, then the client supplied one time passcode is valid. Save the value of ddynamic and return a success message at step 11.13.

11.11 If dctr exceeds a predetermined threshold, return a failure message and return to step 11.8 for one more iteration. If the subsequent repetition of steps 11.8-11.11 fails (steps 11.14), return "verification failed" message as in step 11.15 with the operation proceeding to step 11.13.

11.12a If at step 11.4 the CCLI matches the CODE, update ddynamic using one or more operations as described in step 11.3 in the client algorithm. Store ddynamic.

11.12b Return a success message.

11.13 Wait for another one time passcode to be entered and proceed to step 11.3 for processing.

For all the embodiments in the present invention, the process of generating and verifying one time passcodes is derived from the method described above and is discussed in more detail hereinafter. However, it will understood by those skilled in the art that the scope of the patent claims is not limited to the methods detailed below.

Each client maintains three data items as schematically shown in FIG. 1: IDd, iseed, and skey. IDd corresponds to client identification (ID), a unique identifier, which is used to identify the client. It is not imperative to keep this value secret but it is advised that it is not disclosed. "iseed" corresponds to random number seed, and "skey" corresponds to initial secret key. iseed and skey are typically long numbers, at least 128 bits long. It is necessary to prevent disclosure of these two values since doing so would compromise the security of the system.

IDd and iseed belong to the static class and skey belongs to the dynamic class. These correspond to the dfixed and ddynamic data structures described above. However, it is to be noted that a static class need not have data which is fixed forever. It simply means that the data it contains does not change with each round, whereas data contained in the dynamic class must change with each round. In this method, one component of the static class (IDd) is fixed forever, and one component (iseed) changes during a key reset for clients which support such an operation.

IDd is assigned to the client at manufacture or initialization time and is not changed throughout the lifetime of the client. In the case of a standalone client, iseed and skey are generated by a separate computer and loaded in to the non volatile memory of the client. For all other clients, iseed and skey may either be installed in the client at any point in time before or during client initialization and before the client is used for the first time.

All clients need some kind of non volatile storage or volatile storage which is backed up by a power source to store the above three data items. If any of these data items is corrupted the client will produce incorrect results.

In the case of a standalone client, the three data items must be pre-loaded on to the client before it is shipped to the user, since there is no way of writing to the standalone client's internal memory once it is sealed. In the case of clients with hardware or software interfaces, the clients may or may not be shipped with these data items pre installed. Since the clients provide an interface for data updates, the data items may be loaded on to the clients after they have been received by the user.

Figure 12:
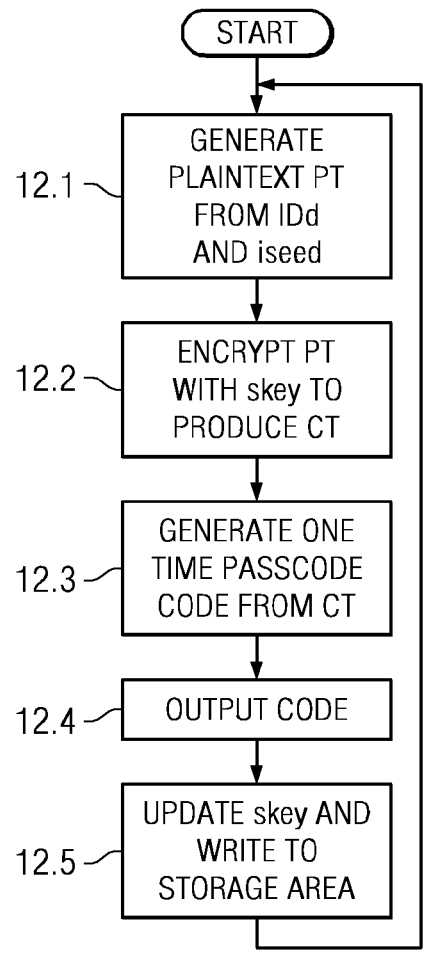
FIG. 12 is a flowchart detailing the process of generation of a one-time passcode on a client as described in the preferred embodiment.

One example algorithm to generate a one time passcode on the client is schematically detailed in FIG. 12. The preferred embodiment contains the following steps:

12.1 At the start, a block of plaintext PT is generated using IDd and iseed. This could be done by a permutation function involving IDd and iseed, or even a simple XOR of IDd and iseed. Eg. PT=IDd XOR iseed.

12.2 PT is encrypted with skey to produce ciphertext CT. This encryption can be done with any block cipher algorithm in any block or stream cipher mode.

12.3 The one time passcode CODE is generated from CT. This could be done using a simple permutation function or an obfuscation function which processes CT and outputs a human readable string of data. This string may consist of, but is not limited to, numbers, small and capital letters and possibly some punctuation symbols.

12.4 The output code is provided.

12.5 The secret key skey is updated and rewritten to the memory storage area allocated to it. This update could be performed using any function which takes one or more of skey, iseed, IDd, CODE and CT as inputs and produces a new data value whose length is the same as skey, and whose inputs are difficult or impossible to determine given the output alone. For example, the value of skey may be updated as follows: skey=H (skey|iseed|IDd) where H represents a hash function, and | represents the concatenation operation.

Step 12.1 needs to be performed only once for a given IDd and iseed. The resulting value of PT may be stored in memory for future use. Steps 12.2-12.5 are performed each time a new one time passcode needs to be generated by the client. The one time passcode generated this way is supplied to the server for authentication.

Figure 13:
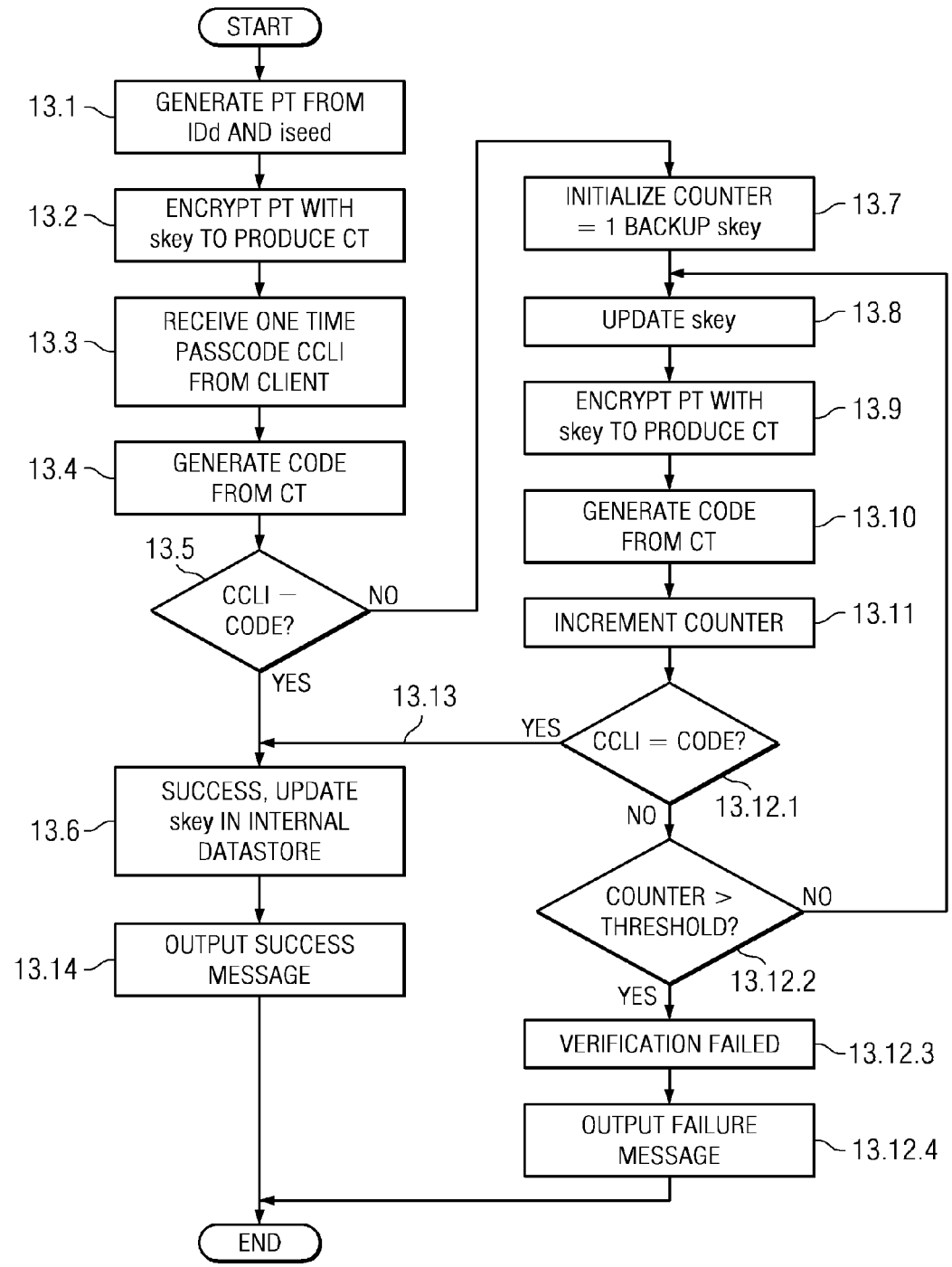
FIG. 13 is a flowchart detailing the process of verification of a user supplied one time passcode by the server as described in the preferred embodiment.

The corresponding algorithm to verify a one time passcode by the server is schematically detailed in FIG. 13. The verification process is described for one client. For each client, the values of IDd, and the initial values of iseed and skey are known to the client and server, allowing them both to perform the required computation. The IDd, iseed and skey values are stored on the server in a database or data store. In the preferred embodiment, the following steps are performed in the server verification of a one-time passcode:

13.1 A block of plaintext (PT) is generated using IDd and iseed. This could be done by a permutation function involving IDd and iseed, or even a simple XOR of IDd and iseed.

13.2 PT is encrypted with skey to produce ciphertext CT. This encryption can be done with any block cipher algorithm in any block or stream cipher mode. The block cipher and mode of operation must be the same as the corresponding cipher and mode used in the client.

13.3 The OTP server receives the client-supplied passcode CCLI.

13.4 The one time passcode CODE is generated from CT. This could be done using a simple permutation function or an obfuscation function which processes CT and outputs a human readable string of data. This string may consist of, but is not limited to, numbers, small and capital letters and possibly some punctuation symbols. This step must use the same function as step 12.3 on the client 13.5 The OTP server compares CCLI with CODE generated in the previous step. If the two are identical, there is a match and the client has supplied a valid passcode. Proceed to step 13.6.

13.6 The server updates its secret key skey. This update could be performed using any function which takes one or more of skey, iseed, IDd, CODE and CT as inputs and produces a new data value whose length is the same as skey, and whose inputs are difficult or impossible to determine given the output alone. For example, the value of skey may be updated as follows: skey=H(skey|iseed|IDd) where H represents a hash function, and | represents the concatenation operation. This operation is performed using the same mechanism the client uses in step 12.4 of the client algorithm.

13.7 If CCLI does not match CODE, the client could be ahead of the server. This may happen if the user requests the client to generate one or more passcodes accidentally. The server tries to determine if this is the case, and catch up with the client if possible. The current value of skey is saved to a temporary variable and the server iterates through the passcode generation process a fixed number of times trying to match CCLI with successive CODE values generated on the server.

13.8 The secret key skey is updated using the same mechanism the client uses in step 12.4 of the client algorithm. This update could be performed using any function which takes one or more of skey, iseed, IDd, CODE and CT as inputs and produces a new data value whose length is the same as skey, and whose inputs are difficult or impossible to determine given the output alone. For example, the value of skey may be updated as follows: skey=H(skey|iseed|IDd) where H represents a hash function, and | represents the concatenation operation.

13.9 PT is encrypted with the new value of skey to produce ciphertext CT. This is the same as step 13.2 but with a different skey value.

13.10 A new one-time passcode CODE is generated from CT following the procedure used in step 13.4.

13.11 Through an increment counter 13.11, the next steps as follows.

13.12.1 The CODE is compared with CCLI. If they match, then the client is ahead of the server. In this case, the server writes out the current value of skey to its database and returns a success message, similar to step 13.6.

13.12.2 If the user has performed steps 13.8 through 13.12 more than a pre determined number of times, the counter recognizes the attempts as exceeding a threshold limit. Otherwise the user is guided to return to step 13.8 for another iteration.

13.12.3 The system then assumes that the client has generated an invalid passcode.

13.12.4 A failure message is returned with the operation terminating thereafter.

13.13 If the CODE and CCLI match, the user is guided to step 13.6.

13.14 The server returns a success message.

As mentioned above, the server needs to store IDd, iseed and skey values for every client in a data store or database for retrieval and update. The server may also maintain additional data including but not limited to information regarding the status of each client, bookkeeping information such as the time of the last successful authentication and the last authentication failure, links to other database tables or keys, and other information identifying the user. This data store or database may be on the same computer as the server, or it may be on a different computer. In the second case the server may need to access the data store or database across a network and care should be taken to secure this communication channel. The process of securing server access to the data store or database is outside the scope of this invention.

The server may provide a programmatic, graphical or command line based interface for administration purposes. A clearly defined programmatic interface to the server is useful when the server needs to be integrated into other software or hardware and not used as a standalone application. A graphical interface is useful when the server may be deployed as a standalone application. A command line interface is useful when the server does not run on a graphics capable workstation or needs to be accessed across a network using command line tools such as ssh or telnet. Some of these interfaces are described in the embodiments below.

Integration with Other Applications

Figure 14:
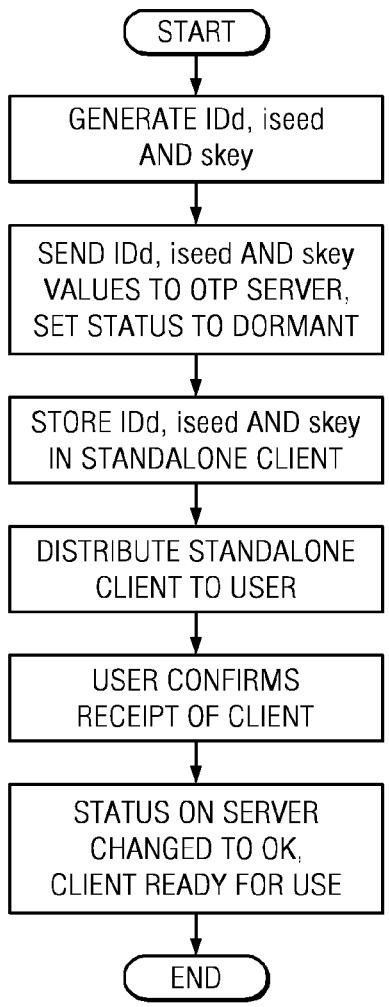
FIG. 14 is a flowchart detailing the process of distribution and initialization of standalone clients.
Figure 15:
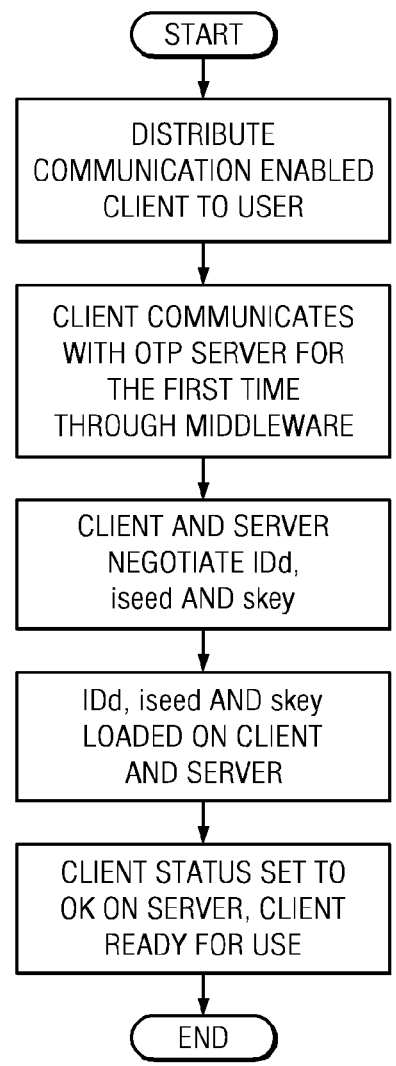
FIG. 15 is a flowchart detailing the process of distribution and initialization of communication enabled clients.

One of the main purposes of one time passcode systems is to provide an added layer of securty during the authentication process for other applications. To this end, the present invention describes two methods of integrating existing applications with the server. In the first method, (see FIG. 14), the application software makes use of stubs (OAS) which perform authentication of one time passcodes (OTP). The application server software may be statically linked to the stub for security reasons. Alternatively, if the security of the computer on which the application runs can be ensured, the stub might be provided as a shared object or dynamic link library which is used by the application at run time. The application software calls a function on the stub to perform authentication of a user supplied one time password. It is the responsibility of the stub to establish a secure communication channel with the server, perform authentication of the application supplied one time passcode and return a success or failure result. This entire process is transparent to the application. The stub may provide a simple function call interface for one time passcode authentication, making it appear like a simple local function call to the application. The second method is applicable mainly to web based services and applications. The basic steps of the second method are schematically shown in FIG. 15.

Figure 9:
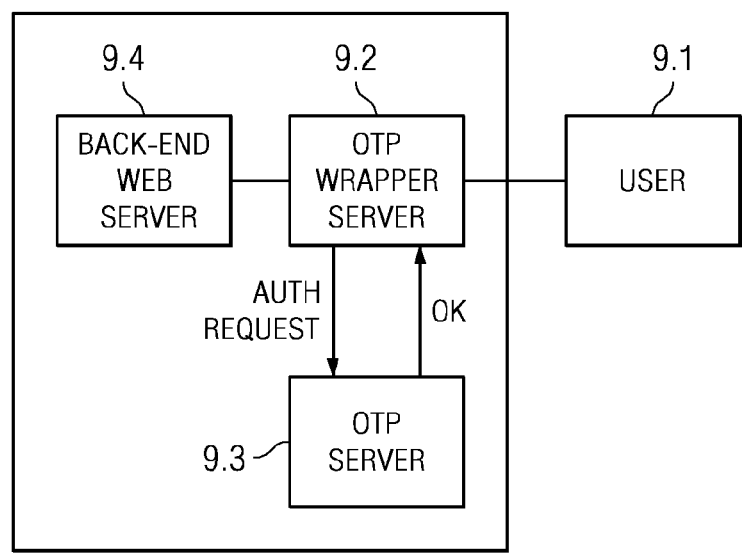
FIG. 9 is a schematic illustration of a situation where a web enabled application server uses web wrappers for authentication of a one time passcode.

An increasingly large number of services are being made available through web interfaces, either on local intranets or across the Internet. As schematically illustrated in FIG. 9, the system of the present invention allows to wrap web based applications with an additional one time passcode authentication layer. For example, a web service requires a user name and password to login. The wrapper asks the user for his user name, password and an extra one time passcode. Before sending any data to the real back end application web server, the wrapper performs an authentication of the user supplied one time passcode. If this authentication fails, the user is not allowed to continue. For increased security, the back end application web server must be configured to accept incoming connections only from the wrapper server.

Figure 5:
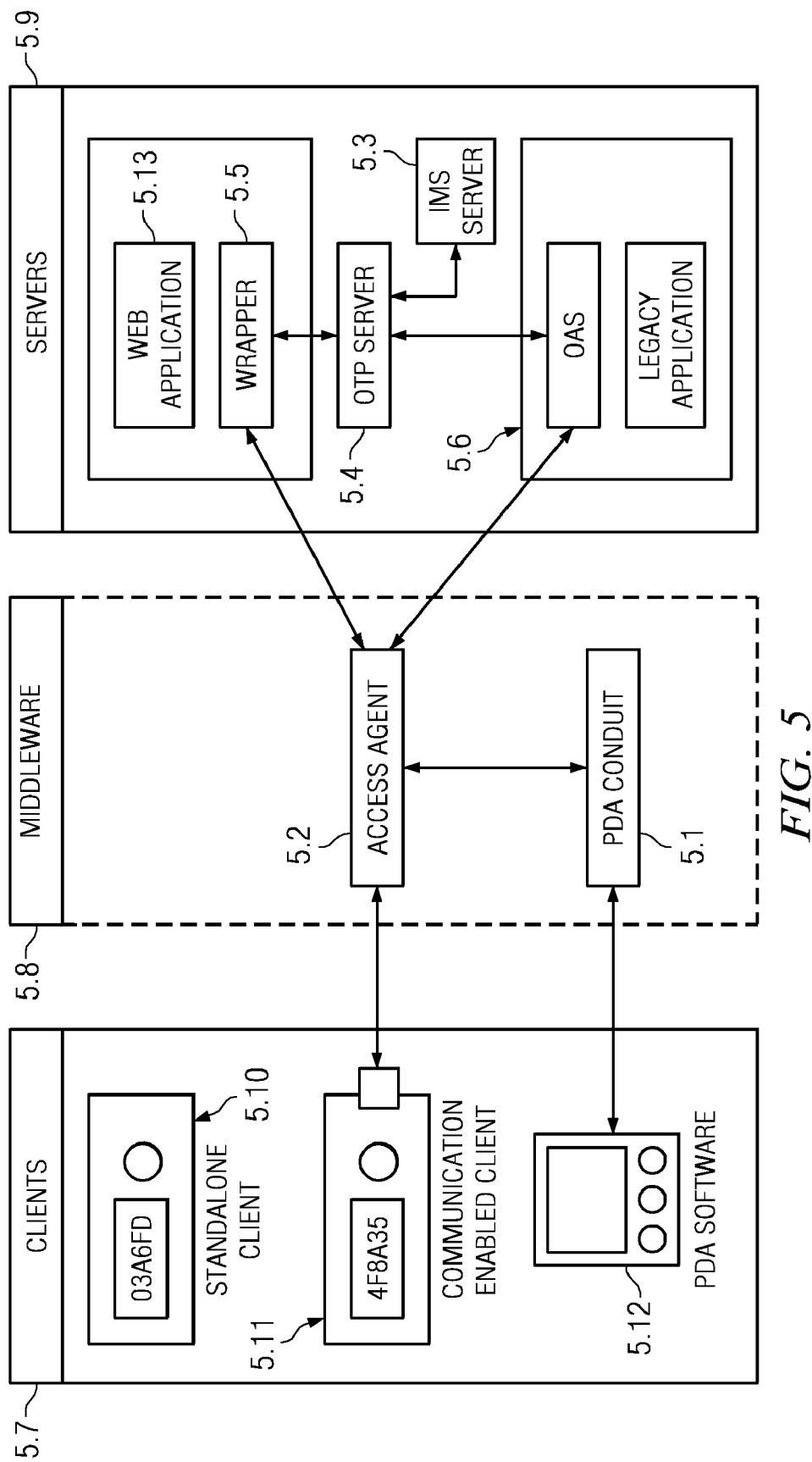
FIG. 5 is a schematic view of the one time passcode system architecture of the present invention integrated with a specific accent agent, including clients, middleware and servers and illustrates possible communication channels between them.

FIG. 5 schematically illustrates one of the preferred embodiments of a typical system where one time passcodes are used as one step of the authentication process. The one time passcode architecture is integrated with and is a part of the proprietary TCI infrastructure, which has a number of major components, such as Clients 5.7, Middleware 5.8 and Servers 5.9. The major components include USB combo keys, PDA (Soft-OTP client), Access Agent, IMS Server, OTP server, and application servers. The clients 5.7 may include standalone client 5.10, communication enabled client 5.11 and a PDA device 5.12 provided with PDA software. The Middleware includes Access Agent 5.2 and PDA Conduit 5.1 connectable to Client 5.7. The Servers may include a variety of applications, such as Web applications 5.13, wrapper 5.5, OTP server 5.4, IMS server 5.3 and OAS 5.6 running on Legacy application.

The Universal Serial Bus (USB) combo Keys are personalized identity devices that allow users to uniquely establish their identities for identity-based functions, such as authentication and access control. The identification Keys can be implemented in both hardware and software. The hardware Keys are identity devices with built-in cryptographic capabilities.

The USB Key is a highly-portable and tamper-evident hardware key with the popular Universal Serial Bus (USB) interconnect mechanism. A built-in smart-card chip provides advanced cryptographic functions, such as RSA 1024-bit encryption and digital signature. A private key generated in the smart-card chip never leaves the USB Key, providing further assurance that the digital identity is secure. The USB Key is further protected by a user's personal passcode and is effective for two-factor authentication.

An embedded flash RAM with capacity from 16 MB to 64 MB allows storage of large number of credentials. The combo key has an LCD screen capable of displaying alphanumeric characters. The key also has a button which when pressed triggers the generation of a one time passcode which is displayed on the LCD screen. An internal rechargeable battery provides power for the LCD and the components necessary to generate the one time passcode.

Software which runs on portable or handheld computing enabled devices such as PDA's may perform the same task as a communication enabled client through the PDA conduit schematically shown in FIGS. 4 and 5 and designated by numerals 4.1 and 5.1, respectively.

The AccessAgent 5.2 is a server-managed agent that runs on the end-user machines and proxies authentication for end-users by capturing and subsequently mimicking their actions. This enables the Access Agent to provide almost immediate single sign-on since end-users do not need to reenter or remember passwords to their different applications.

The IMS Server 5.3 utilized in the system of the present invention may be a Java application server that forms the hub of all TCI functionality. It provides a browser-based user interface for administration, detailed audit logs and transparently manages digital certificates using a built-in Certificate Authority (CA).

The IMS Server 5.3 provides the following functions in the instant system:

Centralized user administration including global deprovisioning;

Global policy definition and enforcement;

Detailed and enterprise-wide audit logs.

The IMS Server 5.3 communicates with the Access Agents 5.2 using SOAP. It uses a simple XML-based language to specify global settings and to control Access Agent actions such as authentication proxy, policy definition and enforcement. End-user credentials are also backed up in an encrypted form on the IMS Server 5.3.

The OTP server 5.4 is a separate application which could reside on the same computer as the IMS server 5.3 or on a different computer. The OTP server 5.4 is connected to the IMS server 5.3 through a point to point link. This is to ensure that only the IMS server 5.3 can access the OTP server 5.4.

The Application Servers could be banking applications, enterprise login, stock broking website, etc. The banking application and stock broking website use OAS stubs to perform OTP authentication with the OTP server, as schematically illustrated in FIG. 5 and designated by numerals 5.6. The enterprise portal login website makes use of web wrappers 5.5 to perform OTP authentication.

Figure 6:
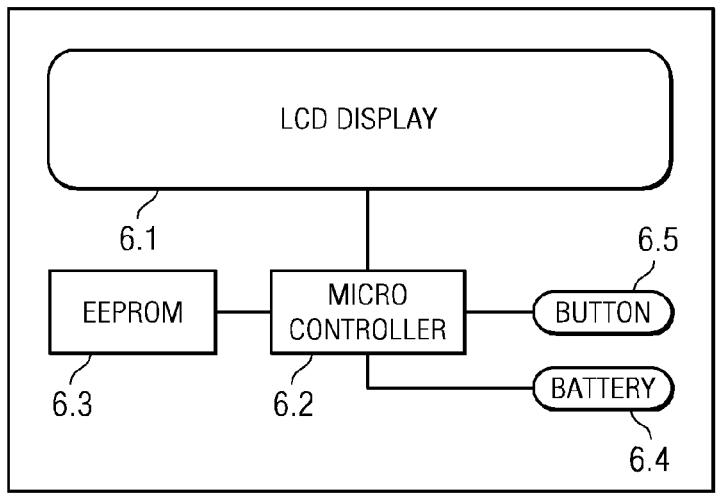
FIG. 6 is a schematic view illustrating the structure of a standalone client device with no external communication mechanism.

In addition to the above major components, users may be provided with standalone clients for the sole purpose of generating one time passcodes. One of such standalone clients is schematically illustrated in FIG. 6. The standalone clients usually comprises a LCD display 6.1, micro controller 6.2 operationally connected to memory, for instance EEPROM 6.3 and a power source, such as a battery 6.4. Typically, an on/off button 6.5 is provided to initiate operation of the client. The user may also choose to use his PDA to run a software client which performs the one time passcode generation and provides other interfaces for rekeying and resetting. Software clients are also provided for OTP generation on a user's computer. These software clients may be integrated with the access agent or in some instances they can be separate software programs.

Figure 7:
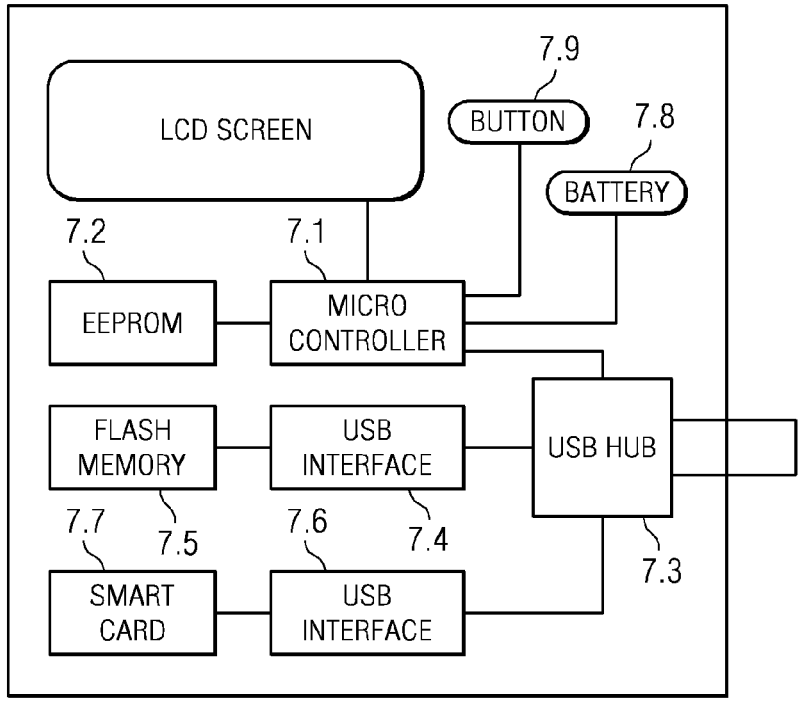
FIG. 7 is a schematic illustration of the structure of a communication enabled client which has a USB interface and is capable of communicating with programs using two software interfaces.

A communication enabled client device is schematically illustrated in FIG. 7. The electrical components of such a device may include a micro controller 7.1 connected to memory device EEPROM 7.2 and tied to a USB hub 7.3. An USB interface 7.4 is similarly connected to the hub 7.3 and to a flash memory device 7.5. Another USB interface 7.6 may be included between a smart card 7.7 and the hub 7.3. The communication enabled client device typically has an independent power source, such as battery 7.8 and an on/off button 7.9 for starting/closing the operation of the device.

Figure 8:
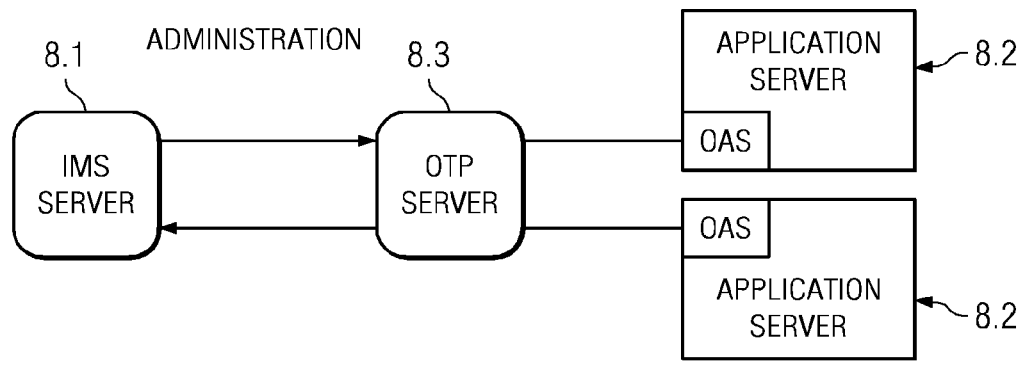
FIG. 8 is a schematic view illustrating a situation where an application server uses authentication stubs (OAS) for authentication of a one time passcode.

During an authentication process, as schematically illustrated in FIG. 8, the IMS server 8.1 communicates with one or more application servers 8.2 through the OTP server 8.3. There is a two-way communication between the IMS server 8.1 and the OTP server 8.3. The application server 8.2 may use OAS stubs to perform the authentication.

If the authentication involves the use of a wrapper server, the process as schematically illustrated in FIG. 9, prescribes for a user 9.1 to communicate with the OTP wrapper server 9.2, which performs the authentication function through requests directed from the OTP wrapper server 9.2 to the OTP server 9.3. If the OTP server properly authenticates the user 9.1, the latter acquires access to the back end web server 9.4.

An organisation deploying the TCI typically has an IMS server installed and configured. The USB keys are distributed to end users with no special configuration or settings. When a user receives his USB key, he initialises it by installing the required software (provided on CDROM or available on the flash memory of the USB key) on his computer which performs a key initialization process the first time the new key is plugged in to the USB port. The access agent communicates with the IMS server over a secured after both parties authenticate each other.

The initialization process performs, among other things, an initialization of the one time passcode system on the USB key. The device ID of the USB key, IDd is fixed. The values of iseed and skey are generated using signed Diffie-Hellman key exchanges between the access agent and the IMS server. In other installations, the USB key itself generates iseed and skey and these are sent to the IMS server after encrypting them with the IMS server public key. Once iseed and skey are generated, these values are stored on the Encentuate USB key. They are also sent to the OTP server by the access agent through the secure channel it has established with the IMS server.

The OTP server maintains data related to each client in a database consisting of two tables: KEYVAL and KEYID-MATCH, schematically illustrated in FIGS. 2 and 3. The KEYVAL table contains complete details about each OTP client. The structure of each record is shown in FIG. 2. KeyID 2.1 is unique 128-bit serial number of OTP client; iseed 2.2 corresponds to the initial 128-bit random number seed; skey 2.3 is the initial 128-bit secret key. Status 2.4 is the status of the OTP client which could be any of the following:

NEW: The OTP client has not yet been initialised.
OK: The OTP client has been initialised and is ready for use or is in use already.
WORKING: The OTP server is performing some operation on this record, e.g., authentication or rekeying.
REKEY: The skey value needs to be changed.
RESET: Both skey and iseed need to be changed.
LOST: The key has been lost, but could be found. Accept no more authentication requests for this key until its status has changed to OK.
REVOKED: The key has been revoked and can never be used again. The status cannot change. Such a record is scheduled for removal at a later date.
DORMANT: This applies only to standalone OTP clients. When the standalone OTP clients and their secret keys are received from the manufacturer, these secret keys are uploaded on to the OTP server database and marked DORMANT, meaning, these OTP clients have not been issued to customers. Once a standalone client has been issued to a customer, its status in the database is changed to OK.

The KEYVAL table also illustrates the functions that may be performed by the system. Last Success 2.5 identifies the date and time of the last successful authentication; Last Failure 2.6 identifies the date and time of the last authentication failure; and Foreign key 2.7 identifies a link to the credentials in the IMS server.

KEYIDMATCH function utilizes data for linking specific applications, user IDs and keys. For example, a user could access three applications A1, A2 and A3 using three different user IDs, ID1, ID2 and ID3. The user could use one OTP client C1 for applications A1 and A2 and another OTP client C2 for application A3. This function binds applications, user IDs and keys. As schematically illustrated in FIG. 3, the function is used to determine the KeyID for OTP authentication purposes, given an application ID, user ID and associated data. The structure of each record is shown in FIG. 3, which represents record structure in the KEYIDMATCH database table.

The AppID 3.1 is a unique application ID used to identify the application; UserID 3.2 is used by the user to identify himself to the application; Other Data 3.3 represents any other data which might also be used for identification; and KeyID (primary key 2.1 in the KEYVAL table) which matches the above three values. As an example, when an administrator needs to find the KeyID for a particular application and the database supports SQL, he could run a query such as: SELECT KeyID from KEYIDMATCH, where AppID=MyAppID and UserID=MyUserID.

The OTP server provides several interfaces, or APIs: authentication interfaces, administration interfaces, and rekeying interfaces. The authentication interfaces are used by programs to authenticate user supplied one time passcodes. The administration interfaces allow the IMS server to perform routine administration tasks on the OTP server. The interfaces provide means to add new USB keys, add standalone keys, add data regarding OTP software running on a PDA and OTP software running on a PC, get the status of clients, set the status of clients, retrieve and store information about the last OTP authentication success or failure, link keys with applications in the KEYIDMATCH database table, retrieve information about all possible keys matching an application—user combination, retrieve all data from the KEYVAL and KEYIDMATCH database tables. The rekeying interfaces provide methods to renegotiate and update iseed and skey values in the OTP server's KEYVAL database table. Methods are provided to reset skey and iseed values, automatically generate iseed or skey values and return the new value to the calling routine, and dynamically generate iseed and skey values using signed or unsigned Diffie-Hellman key exchanges.

In one of the preferred embodiments, the OTP server is administered completely using the user interface on the IMS server. As a backup the OTP server has a command line interface for quick checks and possibly debugging.

During the process of deployment of OTP clients (for standalone clients) the IDd, iseed and skey values are generated on a dedicated secure computer, and loaded into the client. The client is subsequently sealed. Standalone clients are typically manufactued in batches. The IDd, iseed and skey values for all the clients in a batch are stored in a secure data store location or on tamper resistant media. In order to load the IDd, iseed and skey values for standalone clients in to the OTP server database, these values are shipped securely from the manufacturer to the OTP server, and are subsequently loaded in to the OTP server database. Before the user confirms the receipt of the standalone client its status is set to DORMANT. Once the user has confirmed that he has received the client, its status is changed to OK.

When the USB combo keys are shipped, they are all pre-installed with the same software and not customised. The corresponding entry, if any, in the OTP server's KEYVAL database has the status field set to NEW. The IDd, iseed and skey values are left blank. When the combo key is initialised for the first time, the IDd, iseed and skey values are generated and loaded in to the OTP client component of the key. The value of IDd is derived from the identification information present on the smart card component of the key. This is fixed for a given key. The iseed and skey values may be generated using signed Diffie-Hellman key exchanges with the IMS server, or these values may be generated in the smart card and sent to the IMS server for storage on the OTP server after encrypting them with the IMS server public key and signing them with the signing key in the smart card for authentication. After these steps the status of the client is changed to OK and it is ready for use.

OTP clients may be present as a software program in a user's PDA such as Palm or PocketPC based device. The OTP software intended for these devices is not customised for individual users, as such customisation is done at a later point in time. The software may be supplied on CDROMs or other such media or downloaded to the user's PDA. The corresponding entry, if any, in the OTP server's KEYVAL database has the status field set to NEW. When the software is initialised for the first time, it contacts the IMS server through the access agent, performs a key exchange to generate IDd, iseed and skey values, and stores these values in memory. The access agent transfers these values to the OTP server through the IMS server by means of a secure channel. These values may optionally be encrypted using the IMS server's public key. Since access to specific locations on a PDA's memory may not be protected, the iseed and skey values stored on the PDA are encrypted using a symmetric or public key encryption algorithm. After these steps the status of the client on the OTP server database is changed to OK and it is ready for use. In order to access the iseed and skey values stored on the PDA for reading or writing, the user needs to enter a secret password which is used to decrypt iseed and skey for use. This means that the user needs to enter a password each time he needs to generate a fresh one time passcode on his PDA.

Clients may also be software programs on a user's computer such as a Windows PC, Unix workstation or laptop. Installing and initialising such a client is similar to the corresponding process on a PDA. The one time passcode software may be supplied on CDROM or downloaded to the user's computer and installed. The corresponding entry, if any, in the OTP server's KEYVAL database has the status field set to NEW. The initialising process where IDd, iseed and skey are generated are the same as the corresponding process on the PDA. The secret values iseed and skey are encrypted using a user supplied password and stored on the computer. This passcode is necessary to unlock the iseed and skey values whenever they need to be read or written to. After these steps the status of the client on the OTP server database is changed to OK and it is ready for use.

When deploying access agent and OTP middleware, these functions are bundled as one software package which the user can install on his computer. This software may be supplied on CDROMs or other media, or may be downloaded to the user's PC, or may be present in the flash memory in the USB combo key itself.

When a standalone client has been issued to a user, the administrator of the IMS and OTP server changes the state of the given key from DORMANT to OK after confirmation that the user has indeed received the client. From this point onwards, the user may press the button on the client to generate a fresh one time passcode.

As referred to above, the USB combo keys are not pre initialized when they are handed over to users. The initialization of the combo key occurs when it is plugged in to the user's computer for the first time after the access agent is installed. The value of IDd is computed and iseed and skey are generated and stored on the OTP server database as well as on the combo key. From this point onwards, the user may press the button on the client to generate a fresh one time passcode. The status of an OTP client present on the USB combo key is changed to OK either by the administrator or automatically by the IMS server during the initialsation if iseed and skey when the client is activated.

The combo key also provides two software functions which can be accessed by software through the USB port. The first function requests the client to generate a new one time passcode and return the new passcode to the calling function, and optionally display the new passcode on the LCD screen on the client. This function may be used by the access agent to generate fresh one time passcodes and inject these into applications in order to authenticate the user without his intervention. The second function allows for the reset of skey or iseed on the client. This function is used by the access agent to rekey or reset the combo key either when the user requests such an operation, or when the IMS or OTP server request such an operation or after a pre defined time interval has elapsed.

Clients which are in the form of software running on a PDA or other similar device need the user to enter a password before it can generate a new one time passcode. This is necessary since the iseed and skey values stored on the PDA are encrypted using a key derived from the password which the user enters at this stage. PDA software clients may also be accessed through conduits by software running on computers using the two functions specified for the combo key. These two functions are implemented in the PDA software client. These two functions do not depend on the underlying communication channel, which may be (but not restricted to) a serial cable, a USB cable, an infrared link using IRDA, a wireless link and so forth.

Software clients running on the user's computer are similar to software clients running on a PDA or other portable device. These clients need the user to enter a password before it can generate a new one time passcode. This is necessary since the iseed and skey values stored on the PDA are encrypted using a key derived from the password which the user enters at this stage. Software clients on the user's computer may be accessed through application programming interfaces. In another installation, the logic of the software client may be integrated with the access agent itself. In this case the access agent does not depend on an external software OTP client and performs all the tasks, which a software client must execu During the verification process, the OTP server needs to receive a one-time passcode from a client for verification. This may be done in several ways. For instance, the user may be asked to input his one time passcode through a web page which sends the data to the OTP server through the IMS server. The user may also enter the one time passcode through a telephone. In addition, the IMS server may also send the OTP server information about the application and userID for which the one time passcode verification is needed. Alternatively, the IMS server itself may look up the correct keyID corresponding to the client which is being authenticated and send it to the OTP server together with the newly generated one time passcode. The OTP server then performs an authentication and returns a success or failure message, and internally updates the appropriate entries in its database.

During the authentication process, the OTP server changes the state of the key to WORKING. Once the authentication process has completed, the status is changed back to what it was before it was changed to WORKING.

An administration interface is provided by the IMS server for client administration. If a client is lost, for example, a user loses his combo key, the administrator can change the status of the given key to REVOKED. A client which has been revoked can never be used again. If the user feels that the client device has been temporarily misplaced, its status can be changed to LOST. Once the user finds his client device its status can be changed. If the client is a standalone device its status is changed to OK. For clients with external communication interfaces allowing for reset and rekeying, the status of the client is changed to RESET when it is found. The administrator of the IMS server may specify that a particlar client or group of clients need to be rekeyed or reset at specified time intervals. At the end of these intervals, the status of the corresponding keys are changed to REKEY or RESET. The next time there is a communication between the client and the server, a rekey or reset operation is performed and either skey or skey and iseed are updated on both the client and the server.

The system of the present invention performs re-keying and re-setting as well. Rekeying is the process of generating or negotiating a new skey value and updating them on the client and server. Resetting is the process of generating or negotiating new skey and iseed values and updating them on the client and server. Rekey and reset operations may be automated or manually initiated. Automated operations may be time based, i.e., a rekey or reset operation is performed every x days, or use based, i.e., if a client has been used X times, it needs to be rekeyed or reset. Manual operations may be initiated by the server or the user. However it is preferred to allow only the server to initiate manual rekey or reset operations for security reasons.

As an example, should rekeying be performed based on the time elapsed since the last rekey operation, the server may maintain an extra field in the KEYVAL table containing the date and time of the last rekey or reset operation, and possibly another field containing the time interval between two rekey operations. Should the difference between the current time and the time of the last rekey operation exceeds the specified time interval between two rekey operations, the server sets the status flag to REKEY. If the client is already communicating with the server through the middleware, the rekeying operation may be performed immediately. If the client has no communication path to the server, rekeying is postponed till the next time the client tries to establish communication with the server. During the rekey operation, the server itself may generate a new skey value and send it to the middleware. The middleware performs a function call on the client interface which allows for the update of its internal skey value. Alternatively, the new skey may not even be made available to the middleware for security reasons. If the client can perform public key operations and Diffie-Hellman key exchange, the server and client could agree on a new skey value using signed Diffie-Hellman exchanges. During this process, all data transferred from the client to the server may be encrypted using the server's public key, and all data transferred from the server to the client may be encrypted with the client's public key for security reasons. If public key operations are too expensive on the client, public key and Diffie-Hellman operations can be avoided, and the server may simply generate a new skey, encrypt it with the old skey and transfer it to the client through the middleware.

The process of resetting the client follows the same procedure, except that both skey and iseed are changed. This may take place as an exchange of a single key which is later split into iseed and skey, or as two exchanges. It is computationally less expensive to perform a single exchange, and this would be the preferred method of resetting a client.

The one-time passcode authentication server interfaces with application servers using two methods, stubs and web wrappers. In the first method, application servers make use of OTP authentication stub (OAS) modules which provide a layer of abstraction and provide application servers with a simple interface allowing applications to authenticate one time passcodes supplied by users or other applications. For security reasons, it is preferred that the OAS modules be statically linked in to the applications. The OAS provides a single function call OTPAuthenticate( ) which creates a secure conection to a previously configured OTP authentication server, sends the application supplied one time passcode, performs a remote authentication on the OTP server and returns a success or failure message. These application servers may need to be accessed through dedicated client software which are not web enabled.

Communication between the OTP server and application servers are secured using the SCR authentication protocol over a secure SSL connection. In this context, SCR is a proprietary protocol which has been developed by the owner of this invention. It is a process used by two parties to verify each other's identities by means of a challenge response mechanism and using signed certificates enabling both participants to trace the identity of each other up to a trusted certification authority.

The present embodiment also describes web based services such as banking applications which reside on dedicated servers and which cannot be modified in any way. For every application in this category, a server or software provides a wrapper to the legacy application. This wrapper may be seen as the first line of defense. The wrapper reads the userID and the one time passcode entered by the user, communicates securely with a previously configured OTP server, performs an authentication which returns a success or failure, and based on the result either allows or disallows further access to the legacy back end server. For security reasons, the user is required to enter his userID, password and one time passcode all at once. The wrapper server does not inform the user about which part of the input data, i.e., userID, password or one time passcode is incorrect. The back end legacy server is also configured to accept connections only from the wrapper server.

FIG. 4 schematically illustrates a second embodiment of the system of the present invention, where one time passcodes are used as one step in the authentication process. This system is similar to the system described in the first preferred embodiment but does not include the TCI infrastructure. The system described in the second embodiment consists of the following components: clients, middleware, server, and application servers.

In this embodiment, the four types of clients described earlier may be utilised, viz., standalone clients 4.2 with no external software or hardware interface except a single button 4.3 which makes the client generate a new one time passcode, communication enabled client hardware devices 4.4 with an external USB or serial interface, software clients 4.5 on PDAs and software clients on computers such as PCs or workstations.

The middleware 4.6 is an independent software application running on a user's computer (PC, workstation, etc) which allows for the computer communicate with clients and servers, to request the generation of a new one time passcode on a client through a software interface, perform automatic or manual rekeying and reset of clients, perform key exchanges between clients and servers, and initiate key generation on clients and securely transfer this newly generated key to servers.

The server is an independent software application running on a dedicated computer which is connected to a local area network in order to communicate with users' computers. The computer on which the server resides also contains a database management system which is used to store client data.

In this embodiment, the application servers make use of the OTP 4.7 by means of OAS modules 4.8 which are statically linked into the application server executables. Application servers may be accessed through web based interfaces, APIs or dedicated graphical or command line interfaces.

An organisation deploying the infrastructure described in the present embodiment needs to have a one time passcode server installed and configured. Communication enabled clients are mass produced and distributed to end users with no special configuration or settings. When a user receives a communication enabled client, he initialises it by installing the required software (provided on CDROM or available on a corporate website etc.) on his computer which performs a key initialization process the first time the new key is connected to the user's computer. The middleware communicates with the OTP server over a secured after both parties authenticate each other.

The initialization process performs an initialization of the one time passcode system on the communication enabled client. The device ID of the communication enabled client, IDd is fixed. The values of iseed and skey are generated using signed Diffie-Hellman key exchanges between the middleware and the OTP server. In other installations, the communication enabled client itself generates iseed and skey and these are sent to the OTP server after encrypting them with the OTP server public key. Once iseed and skey are generated, these values are stored on the communication enabled client.

Software clients which may be used on PDAs, portable computing devices or on the computer itself, are also initialised using a process similar to the steps described in the preceding two paragraphs. In addition, the user needs to supply the client with a secret password to secure the iseed and skey values. This password needs to be supplied by the user each time iseed and skey need to be read or written to for any purpose.

Similarly to the first embodiment, the system of the system of the second embodiment provides for the OTP server to maintain data related to each client in a database consisting of two tables: KEYVAL and KEYIDMATCH.

The KEYVAL table, schematically shown in FIG. 2, contains complete details about each OTP client. The structure of each record is shown in FIG. 2 includes the following data:

KeyID 2.1: Unique 128-bit serial number of OTP client
iseed 2.2: Initial 128-bit random number seed
skey 2.3: Initial 128-bit secret key
Status 2.4: The status of the OTP client which could be
- NEW: The OTP client has not yet been initialised.
- OK: The OTP client has been initialised and is ready for use or is in use already.
- WORKING: The OTP server is performing some operation on this record, e.g., authentication or rekeying.
- REKEY: The skey value needs to be changed.
- RESET: Both skey and iseed need to be changed.
- LOST: The key has been lost, but could be found. Accept no more authentication requests for this key until its status has changed to OK.
- REVOKED: The key has been revoked and can never be used again. The status cannot change. Such a record is scheduled for removal at a later date.
- DORMANT: This applies only to standalone OTP clients. When the standalone OTP clients and their secret keys are received from the manufacturer, these secret keys are uploaded on to the OTP server database and marked DORMANT, meaning, these OTP clients have not been issued to customers. Once a standalone client has been issued to a customer, its status in the database is changed to OK.

Last Success 2.5: The date and time of the last successful authentication
Last Failure 2.6: The date and time of the last authentication failure
Foreign key 2.7: A link to the credentials in the IMS server The KEYIDMATCH table contains data used to link specific applications, user IDs and keys. For example, a user could access three applications A1, A2 and A3 using three different user IDs, ID1, ID2 and ID3. The user could use one OTP client C1 for applications A1 and A2 and another OTP client C2 for application A3. This structure binds applications, user IDs and keys. It is used to determine the KeyID for OTP authentication purposes, given an application ID, user ID and associated data. The structure of each record is schematically illustrated in FIG. 3. Similarly to the first embodiment, AppID 3.1 designates a unique application ID used to identify the application; UserID 3.2 designates the User ID used by the user to identify himself to the application, Other Data 3.3 designates any other data which might also be used for identification, and KeyID 3.4 designates the KeyID (primary key in the KEYVAL table) which matches the above three values.

The OTP server provides three classes of interfaces, or APIs: Authentication interfaces, Administration interfaces, and Rekeying interfaces.

Authentication interfaces are used by programs to authenticate user supplied one time passcodes. Administration interfaces allow the IMS server to perform routine administration tasks on the OTP server. The interfaces provide means to add new clients, add data regarding OTP software running on a PDA and OTP software running on a PC, get the status of clients, set the status of clients, retrieve and store information about the last OTP authentication success or failure, link keys with applications in the KEYIDMATCH database table, retrieve information about all possible keys matching an application—user combination, retrieve all data from the KEYVAL and KEYIDMATCH database tables.

Rekeying interfaces provide methods to renegotiate and update iseed and skey values in the OTP server's KEYVAL database table. Methods are provided to reset skey and iseed values, automatically generate iseed or skey values and return the new value to the calling routine, and dynamically generate iseed and skey values using signed or unsigned Diffie-Hellman key exchanges. In this embodiment, the OTP server provides a graphical and command line interface for administration. The server also provides access points for OAS modules to communicate with it.

In the course of deployment of clients, particularly standalone clients, the IDd, iseed and skey values are generated on a dedicated secure computer, and loaded into the client. The client is subsequently sealed. Standalone clients are typically manufactued in batches. The IDd, iseed and skey values for all the clients in a batch are stored in a secure data store location or on tamper resistant media. In order to load the IDd, iseed and skey values for standalone clients in to the OTP server database, these values are shipped securely from the manufacturer to the OTP server, and are subsequently loaded in to the OTP server database. Before the user confirms the receipt of the the standalone client its status is set to DORMANT. Once the user has confirmed that he has received the client, its status is changed to OK.

When communication enabled keys are shipped, they are all preinstalled with the same software and may or may not be customised. The corresponding entry, if any, in the OTP server's KEYVAL database has the status field set to NEW if the client is not customised (blank or uni-initialised client), and OK if the client already has iseed and skey values installed (pre initialised client). The IDd, iseed and skey values are left blank for un-initialised clients. When the un-initialised communication enabled client is initialised for the first time, the IDd, iseed and skey values are generated and loaded in to it. The iseed and skey values may be generated using signed Diffie-Hellman key exchanges with the server. After these steps the status of the client is changed to OK and it is ready for use.

OTP clients may be present as a software program in a user's PDA such as Palm or PocketPC based device. The OTP software intended for these devices is not customised for individual users, as such customisation is done at a later point in time. The software may be supplied on CDROMs or other such media or downloaded to the user's PDA. The corresponding entry, if any, in the OTP server's KEYVAL database has the status field set to NEW. When the software is initialised for the first time, it contacts the server through the middleware, performs a key exchange to generate IDd, iseed and skey values, and stores these values in memory. The middleware transfers these values to the OTP server by means of a secure channel. These values may optionally be encrypted using the server's public key. Since access to specific locations on a PDA's memory may not be protected, the iseed and skey values stored on the PDA are encrypted using a symmetric or public key encryption algorithm.

After these steps, the status of the client in the server database is changed to OK and it is ready for use. In order to access the iseed and skey values stored on the PDA for reading or writing, the user needs to enter a secret password which is used to decrypt iseed and skey for use. This means that the user needs to enter a password each time he needs to generate a fresh one time passcode on his PDA.

Clients may also be software programs on a user's computer such as a Windows PC, Unix workstation or laptop. Installing and initialising such a client is similar to the corresponding process on a PDA. The one time passcode software may be supplied on CDROM or downloaded to the user's computer and installed. The corresponding entry, if any, in the OTP server's KEYVAL database has the status field set to NEW. The initialising process where IDd, iseed and skey are generated are the same as the corresponding process on the PDA. The secret values iseed and skey are encrypted using a user supplied password and stored on the computer. This passcode is necessary to unlock the iseed and skey values whenever they need to be read or written to. After these steps the status of the client on the server database is changed to OK and it is ready for use.

During the task of deploying the OTP middleware, the user is aware that the middleware is supplied as a software package, which the user can install on his computer. This software may be supplied on CDROMs or other media, or may be downloaded to the user's PC from a corporate website and other such sources.

In the course of using the OTP client, a standalone client has been issued to a user. The administrator of the server changes the state of the given key from DORMANT to OK after confirmation that the user has indeed received the client. From this point onwards, the user may press the button on the client to generate a fresh one time passcode. As discussed above, communication enabled client keys may not be pre initialized when they are handed over to users. For pre initialized keys, the initialization and deployment process is the same as that for the standalone client. The initialization of the un-initialized key occurs when it is plugged in to the user's computer for the first time after the middleware is installed. The value of IDd is computed and iseed and skey are generated and stored on the server database as well as on the combo key.

From this point onwards, the user may press the button on the client to generate a fresh one time passcode. The status of a client is changed to OK either by the administrator or automatically by the server during the initialsation if iseed and skey when the client is activated. The communication enabled client also provides two software functions which can be accessed by software through the USB port. The first function requests the client to generate a new one time passcode and return the new passcode to the calling function, and optionally display the new passcode on the LCD screen on the client. This function may be used by the access agent to generate fresh one time passcodes and inject these into applications in order to authenticate the user without his intervention.

The second function allows for the reset of skey or iseed on the client. This function is used by the access agent to rekey or reset the client either when the user requests such an operation, or when the server requests such an operation or after a pre defined time interval has elapsed.

Clients which are in the form of software running on a PDA or other similar device need the user to enter a password before it can generate a new one time passcode. This is necessary since the iseed and skey values stored on the PDA are encrypted using a key derived from the password which the user enters at this stage. PDA software clients may also be accessed through conduits by software running on computers using the two functions specified for the communication enabled key. These two functions are implemented in the PDA software client. These two functions do not depend on the underlying communication channel, which may be (but not restricted to) a serial cable, a USB cable, an infrared link using IRDA, a wireless link and so forth.

Software clients running on the user's computer are similar to software clients running on a PDA or other portable device. These clients need the user to enter a password before it can generate a new one time passcode. This is necessary since the iseed and skey values stored on the PDA are encrypted using a key derived from the password which the user enters at this stage. Software clients on the user's computer may be accessed through application programming interfaces.

In order to perform verification, the server needs to receive a one time passcode from a client for verification. This may be done in several ways. For instance, the user may be asked to input his one time passcode through a web page which sends the data to the server. The user may also enter the one time passcode through a telephone. Alternatively, the application server itself may look up the correct keyID corresponding to the client which is being authenticated and send it to the server together with the newly generated one time passcode. The server then performs an authentication and returns a success or failure message, and internally updates the appropriate entries in its database.

During the authentication process, the server changes the state of the key to WORKING. Once the authentication process has completed, the status is changed back to what it was before it was changed to WORKING.

For the purposes of system administration, an administration interface is provided by the server for client administration. If a client is lost, for example, suppose a user loses his combo key, the administrator can change the status of the given key to REVOKED. A client which has been revoked can never be used again. If the user feels that the client device has been temporarily misplaced, its status can be changed to LOST. Once the user finds his client device its status can be changed. If the client is a standalone device its status is changed to OK. For clients with external communication interfaces allowing for reset and rekeying, the status of the client is changed to RESET when it is found. The administrator of the server may specify that a particlar client or group of clients need to be rekeyed or reset at specified time intervals. At the end of these intervals, the status of the corresponding keys are changed to REKEY or RESET. The next time there is a communication between the client and the server, a rekey or reset operation is performed and either skey or skey and iseed are updated on both the client and the server.

The system of the second embodiment of the present invention performs re-keying and resetting functions similar to those performed in the process of the first embodiment. Rekeying is the process of generating or negotiating a new skey value and updating them on the client and server. Resetting is the process of generating or negotiating new skey and iseed values and updating them on the client and server. Rekey and reset operations may be automated or manually initiated. Automated operations may be time based, i.e., a rekey or reset operation is performed every x days, or use based, i.e., if a client has been used X times, it needs to be rekeyed or reset. Manual operations may be initiated by the server or the user. However it may be preferable to allow only the server to initiate manual rekey or reset operations for security reasons.

In the second embodiment, the OTP authentication server interfaces with application servers using two methods, stubs and web wrappers, which are similar to the process of the first embodiment. In the stubs method, application servers make use of OTP authentication stub (OAS) modules which provide a layer of abstraction and provide application servers with a simple interface allowing applications to authenticate one time passcodes supplied by users or other applications. For security reasons, the OAS modules should be statically linked in to the applications. The OAS provides a single function call OTPAuthenticate( ) which creates a secure conection to a previously configured OTP authentication server, sends the application supplied one time passcode, performs a remote authentication on the OTP server and returns a success or failure message. These application servers may need to be accessed through dedicated client software which are not web enabled.

The second embodiment also enables web based services such as banking applications which reside on dedicated servers and which cannot be modified in any way. For every application in this category, a server or software provides a wrapper to the legacy application. This wrapper may be seen as the first line of defense. The wrapper reads the userID and the one time passcode entered by the user, communicates securely with a previously configured OTP server, performs an authentication which returns a success or failure, and based on the result either allows or disallows further access to the legacy back end server. For security reasons, the user is required to enter his userID, password and one time passcode all at once. The wrapper server does not inform the user about which part of the input data, i.e., userID, password or one time passcode is incorrect. The back end legacy server is also configured to accept connections only from the wrapper server.

The third embodiment of the system of the present invention provides for a system where one time passcodes are used as one step in the authentication process. This is similar to the system described in the first embodiment but does not include the proprietary TCI infrastructure. The system of the third embodiment comprises the following major components: clients, server and application servers.

In the third embodiment, only one type of client is used, viz, the standalone client with no external software or hardware interface except a single button which makes the client generate a new one time passcode. The server is an independent software application running on a dedicated computer. The server may be able to communicate with other applications which may be residing on other computers. The computer on which the server resides also contains a database management system which is used to store client data. The application servers make use of the OTP server by means of OAS modules, which are statically linked into the application server executables. Application servers may be accessed through web based interfaces, APIs or dedicated graphical or command line interfaces.

An organisation deploying the infrastructure included in the third embodiment needs to have a one time passcode server installed and configured. Similarly to the first two embodiments, the OTP server of the third embodiment maintains data related to each client in a database consisting of two tables. KEYVAL AND KEYIDMATCH. With reference to FIG. 2, KEYVAL table contains complete details about each OTP client, where KeyID 2.1 is a unique 128-bit serial number of OTP client, iseed 2.2 is the initial 128-bit random number seed, skey 2.3 is the initial 128-bit secret key. Status 2.4 is the status of the OTP client which could be NEW: The OTP client has not yet been initialised.

OK: The OTP client has been initialised and is ready for use or is in use already.

WORKING: The OTP server is performing some operation on this record, e.g., authentication or rekeying.

LOST: The key has been lost, but could be found. Accept no more authentication requests for this key until its status has changed to OK.

REVOKED: The key has been revoked and can never be used again. The status cannot change. Such a record is scheduled for removal at a later date.

DORMANT: This applies only to standalone OTP clients. When the standalone OTP clients and their secret keys are received from the manufacturer, these secret keys are uploaded on to the OTP server database and marked DORMANT, meaning, these OTP clients have not been issued to customers. Once a standalone client has been issued to a customer, its status in the database is changed to OK.

Last Success position 2.5 designates the date and time of the last successful authentication, Last Failure 2.6 designates the date and time of the last authentication failure, and Foreign key 2.7 designates a link to the credentials in the IMS server The KEYIDMATCH table of FIG. 3 contains data used to link specific applications, user IDs and keys. For example, a user could access three applications A1, A2 and A3 using three different user IDs, ID1, ID2 and ID3. He could use one OTP client C1 for applications A1 and A2 and another OTP client C2 for application A3. This table binds applications, user IDs and keys. It is used to determine the KeyID for OTP authentication purposes, given an application ID, user ID and associated data. In FIG. 3, the fields or records are designated as follows: AppID 3.1 designates a unique application ID used to identify the application, UserID 3.2 designates the User ID used by the user to identify himself to the application, Other Data 3.3 designates any other data which might also be used for identification, KeyID 3.4 designates the KeyID (primary key in the KEYVAL table) which matches the above three values.

The OTP server of the third embodiment provides a number of interfaces or APIs: authentication interfaces and administration interfaces. Authentication interfaces are used by programs to authenticate user supplied one time passcodes. Administration interfaces allow the IMS server to perform routine administration tasks on the OTP server. The interfaces provide means to add new clients, get the status of clients, set the status of clients, retrieve and store information about the last OTP authentication success or failure, link keys with applications in the KEYIDMATCH database table, retrieve information about all possible keys matching an application—user combination, retrieve all data from the KEYVAL and KEYIDMATCH database tables.

In this embodiment, the OTP server provides a graphical and command line interface for administration. The server also provides access points for OAS modules to communicate with it.

In the third embodiment, the system utilizes only standalone clients. The IDd, iseed and skey values are generated on a dedicated secure computer, and loaded into the client. The client is subsequently sealed. Standalone clients are typically manufactued in batches. The IDd, iseed and skey values for all the clients in a batch are stored in a secure data store location or on tamper resistant media. In order to load the IDd, iseed and skey values for standalone clients in to the OTP server database, these values are shipped securely from the manufacturer to the OTP server, and are subsequently loaded in to the OTP server database. Before the user confirms the receipt of the the standalone client its status is set to DORMANT. Once the user has confirmed that he has received the client, its status is changed to OK.

When a standalone client has been issued to a user, the administrator of the server changes the state of the given key from DORMANT to OK after confirmation that the user has indeed received the client. From this point onwards, the user may press the button on the client to generate a fresh one time passcode.

In order to accomplish verification, the server needs to receive a one time passcode from a client. This step may be done in several ways. For instance, the user may be asked to input his one time passcode through a web page which sends the data to the server. The user may also enter the one time passcode through a telephone. Alternatively, the application server itself may look up the correct keyID corresponding to the client which is being authenticated and send it to the server together with the newly generated one time passcode. The server then performs an authentication and returns a success or failure message, and internally updates the appropriate entries in its database.

During the authentication process, the server changes the state of the key to WORKING. Once the authentication process has completed, the status is changed back to what it was before it was changed to WORKING.

An administration interface is provided by the server for client administration. If a client is lost, for example when a user loses his combo key, the administrator can change the status of the given key to REVOKED. A client which has been revoked can never be used again. If the user feels that the client device has been temporarily misplaced, its status can be changed to LOST. Once the user finds his client device its status can be changed. If the client is a standalone device its status is changed to OK.

The third embodiment does not provide for re-keying and re-setting operations since the standalone client does not provide any external interface. Consequently, if a compromise is suspected, the client needs to be discarded and a new client issued to the user.

In the third embodiment, the OTP authentication server interfaces with application servers using two methods: stubs and web wrappers.

In the first method, application servers use OTP authentication stub (OAS) modules which provide a layer of abstraction and provide application servers with a simple interface allowing applications to authenticate one time passcodes supplied by users or other applications. For security reasons, the OAS modules should be statically linked in to the applications. The OAS provides a single function call OTPAuthenticate( ) which creates a secure connection to a previously configured OTP authentication server, sends the application supplied one time passcode, performs a remote authentication on the OTP server and returns a success or failure message. These application servers may need to be accessed through dedicated client software which are not web enabled.

The third embodiment also enables web based services such as banking applications which reside on dedicated servers and which cannot be modified in any way. For every application in this category, a server or software provides a wrapper to the legacy application. This wrapper may be seen as the first line of defense. The wrapper reads the userID and the one time passcode entered by the user, communicates securely with a previously configured OTP server, performs an authentication which returns a success or failure, and based on the result either allows or disallows further access to the legacy back end server. For security reasons, the user is required to enter his userID, password and one time passcode all at once. The wrapper server does not inform the user about which part of the input data, i.e., userID, password or one time passcode is incorrect. The back end legacy server is also configured to accept connections only from the wrapper server.

During operation, for each embodiment, the process of distribution and initialization of standalone and communication enabled clients is substantially similar. As schematically illustrated in FIG. 14, a standalone the process is started by a standalone client generating IDd, iseed and skey. The generated values are sent to an OTP server. The status of the server at this time is DORMANT. The generated values of IDd, iseed and skey are stored in the database of the standalone client. The standalone client, such as a personal computer, or PC, is delivered to the user, who confirms receipt of the client. The status of the client on the server is changed to OK, indicating that the client is ready for use by the end user.

To initiate a communication-enabled client, as schematically illustrated in FIG. 15, the following steps are performed after the user obtains the communication enabled client. The client communicates with the OTP server through the middleware (See FIGS. 4 and 5) for the first time. The client and the server negotiate and generate IDd, iseed and skey. These values are then loaded on the client and the server. The client then receives OK status, which is set on the server. At that time, the client is ready for use by the end user.

Many changes and modifications may be made in the process of the present invention without departing from the spirit thereof. We, therefore, pray that our rights to the present invention BE limited only by the scope of the appended claims.

We claim:

1. A method process implemented within a data processing system comprising the steps of:

generating a client-specific identifier, a random number seed and an initial client-specific key in a first data processing system;

storing, by the first data processing system, the client-specific identifier, the random number seed and the initial client-specific key in a temporary storage of the first data processing system as a first client-specific identifier, a first random number seed and a first initial client-specific key;

sending, on initialization of a second data processing system, from the first data processing system, over a computer network, a copy of the client-specific identifier, the random number seed and the initial client-specific key to a second data processing system for storing in the second data processing system as a second client-specific identifier, a second random number seed and a second initial client-specific key;

receiving a user request for a one-time passcode in the second data processing system;

generating in the second data processing system a first plaintext based on the second client-specific identifier and the second random number seed;

encrypting, in the second data processing system, the first plaintext using the second initial client-specific key to create a first ciphertext;

generating, in the second data processing system, the one-time passcode based on the first ciphertext;

outputting, by the second data processing system, only the one-time passcode for the user to the first data processing system; and verifying in the first data processing system the one-time passcode of the second data processing system, wherein the step of verifying the received one-time passcode comprises the steps of:

receiving in the first data processing system only the one-time passcode from the second data processing system;

generating, on the first data processing system, a second plaintext based on the first client-specific identifier and the first random number seed;

encrypting the second plaintext using the first initial client-specific key to create a second ciphertext;

generating a one-time code based on the second ciphertext;

comparing the one-time passcode with the one-time code; and, when the one-time passcode and the one-time code match, allowing user access to the second data processing system.

2. The method of claim 1, further comprising:

generating in second data processing system an updated second client-specific key using the second initial client-specific key, the second client-specific identifier, and the second random number seed; and storing the updated second client-specific key in the second data processing unit.

3. The method of claim 2, wherein the updated second client-specific key contains a new data value having a character length similar to the character length of the second initial client-specific key.

4. The method of claim 1, wherein the second data processing system is selected from a group consisting of hardware devices and software programs.

5. The method of claim 1, further comprising the step of generating a failure message when the one-time passcode exceeds a pre-determined threshold value.

6. The method of claim 1, further comprising:

generating in the first data processing system an updated first client-specific key using the first initial client-specific key, the first client-specific identifier, and the first random number seed; and storing the updated first client-specific key in the temporary storage of the first data processing system.

7. The method of claim 6, wherein the updated first client-specific key contains a new data value having a character length similar to the character length of the first initial client-specific key.

8. A system comprising:

at least one processor; and a memory coupled to the at least one processor, wherein the memory comprises instructions which, when executed by the at least one processor, cause the at least one processor to:

generate a client-specific identifier, a random number seed and an initial client-specific key in a first data processing system;

store, by the first data processing system, the client-specific identifier, the random number seed and the initial client-specific key in a temporary storage of the first data processing system as a first client-specific identifier, a first random number seed and a first initial client-specific key;

send, on initialization of a second data processing system, from the first data processing system, over a computer network, a copy of the client-specific identifier, the random number seed and the initial client-specific key to a second data processing system for storing in the second data processing system as a second client-specific identifier, a second random number seed and a second initial client-specific key;

receive from the second data processing system only a one-time passcode for the user in the first data processing system, wherein the second data processing system generates the one-time passcode by:

receiving a user request for the one-time passcode in the second data processing system;

generating in the second data processing system a first-plaintext based on the second client-specific identifier and the second random number seed;

encrypting, in the second data processing system, the first plaintext using the second initial client-specific key to create a first ciphertext;

generating, in the second data processing system, the one-time passcode based on the first ciphertext; and outputting, by the second data processing system, only the one-time passcode for the user to the first data processing system; and verify by the first data processing system the one-time passcode of the second data processing system, wherein the instructions to verify the received one-time passcode further cause the processor to:

receive in the first data processing system only the one-time passcode from the second data processing system;

generate, on the first data processing system, a second plaintext based on the first client-specific identifier and the first random number seed;

encrypt the second plaintext using the first initial client-specific key to create a second ciphertext;

generate a one-time code based on the second ciphertext;

compare the one-time passcode with the one-time code; and, when the one-time passcode and the one-time code match, allow user access to the second data processing system.

9. The system of claim 8, wherein the instructions further cause the processor to:

generate in the first data processing system an updated first client-specific key using the first initial client-specific key, the first client-specific identifier, and the first random number seed; and store the updated first client-specific key in the temporary storage of the first data processing system.

10. The system of claim 9, wherein the updated first client-specific key contains a new data value having a character length similar to the character length of the first initial client-specific key.

11. The system of claim 8, wherein, upon outputting, by the second data processing system, only the one-time passcode for the user to the first data processing system, the second data processing system:

generates in the second data processing system an updated second client-specific key using the second initial client-specific key, the second client-specific identifier, and the second random number seed; and stores the updated second client-specific key in the second data processing unit.

12. The system of claim 11, wherein the updated second client-specific key contains a new data value having a character length similar to the character length of the second initial client-specific key.

13. The system of claim 8, wherein the second data processing system is selected from a group consisting of hardware devices and software programs.

14. The system of claim 8, wherein the instructions further cause the processor to:

generate a failure message when the one-time passcode exceeds a pre-determined threshold value.

* * * * *